United States Patent
Sato et al.

(10) Patent No.: US 9,456,115 B2
(45) Date of Patent: Sep. 27, 2016

(54) IMAGE OBTAINING APPARATUS

(71) Applicant: MITSUBISHI HEAVY INDUSTRIES, LTD., Tokyo (JP)

(72) Inventors: Mariko Sato, Tokyo (JP); Shojiro Furuya, Tokyo (JP); Yukito Hata, Tokyo (JP)

(73) Assignee: Mitsubishi Heavy Industries, Ltd., Tokyo (JP)

(*) Notice: Subject to any disclaimer, the term of this patent is extended or adjusted under 35 U.S.C. 154(b) by 0 days.

(21) Appl. No.: 14/672,498

(22) Filed: Mar. 30, 2015

(65) Prior Publication Data
US 2015/0281533 A1  Oct. 1, 2015

(30) Foreign Application Priority Data

Mar. 31, 2014  (JP) ................. 2014-074324

(51) Int. Cl.
*H04N 5/225* (2006.01)
*H04N 5/232* (2006.01)
*H04N 7/18* (2006.01)
*G03B 15/00* (2006.01)
*G03B 29/00* (2006.01)
*G05D 1/02* (2006.01)
*G02B 13/00* (2006.01)

(52) U.S. Cl.
CPC ........ *H04N 5/2252* (2013.01); *G02B 13/0015* (2013.01); *G03B 15/006* (2013.01); *G03B 29/00* (2013.01); *H04N 5/2254* (2013.01); *H04N 5/2259* (2013.01); *H04N 5/23203* (2013.01)

(58) Field of Classification Search
CPC ............. H04N 5/2252; H04N 5/2259; H04N 5/23203; H04N 5/2254; G03B 29/00; G03B 15/006; G02B 13/0015
See application file for complete search history.

(56) References Cited

U.S. PATENT DOCUMENTS

| 5,368,254 A * | 11/1994 | Wickholm | F41G 7/2213 244/3.16 |
| 5,681,009 A * | 10/1997 | Vandersteen | F41G 7/008 244/3.16 |
| 6,462,889 B1 * | 10/2002 | Jackson | G02B 5/003 244/3.17 |
| 2012/0002049 A1 * | 1/2012 | Fry | F41G 7/008 348/148 |

FOREIGN PATENT DOCUMENTS

| DE | 4315855 A1 * | 11/1994 |
| GB | 2419932 A * | 5/2006 |
| JP | 2005-173161 | 6/2005 |

* cited by examiner

*Primary Examiner* — Michael J Zanelli
(74) *Attorney, Agent, or Firm* — Wenderoth, Lind & Ponack, L.L.P.

(57) ABSTRACT

An image obtaining apparatus has a swing-type optical system, an optical dome and a correction optical system. The swing-type optical system is configured to adjust a photographing direction based on a swinging operation. The correction optical system corrects transmitted light beams through the optical dome to parallel light beams parallel to the photographing direction.

8 Claims, 6 Drawing Sheets

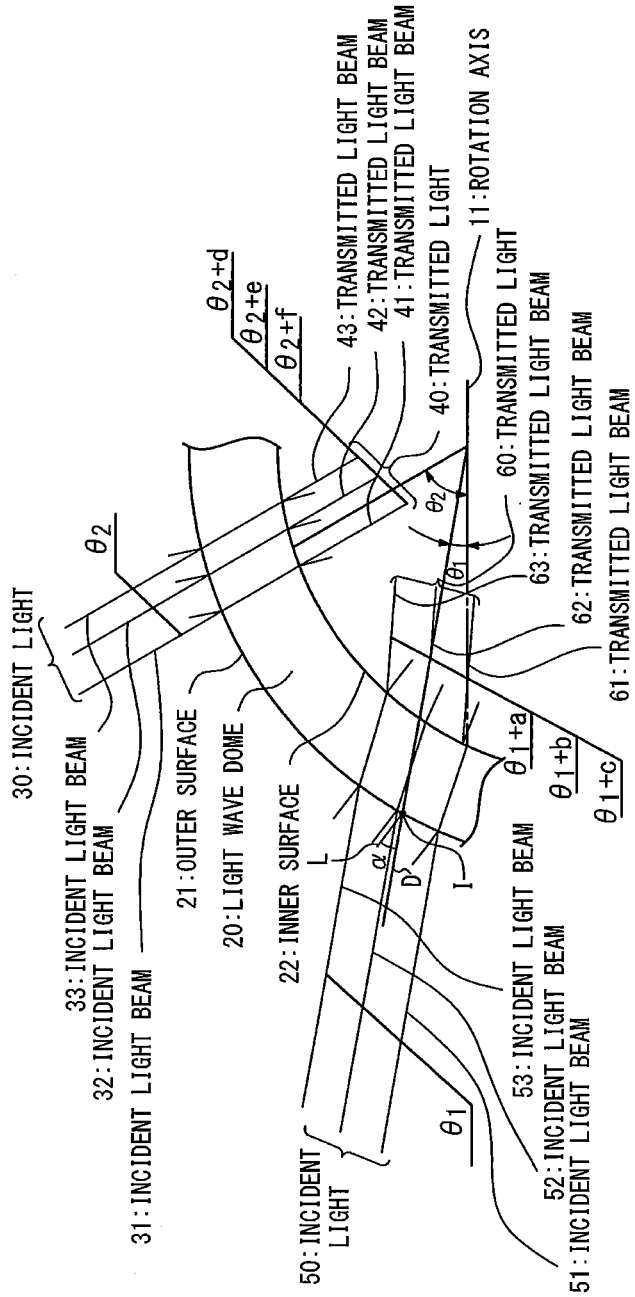

IMAGE OBTAINING APPARATUS

CROSS-REFERENCE

This application claims a priority based on Japanese Patent Application No. JP 2014-074324. The disclosure thereof is incorporated herein by reference.

TECHNICAL FIELD

The present invention relates to an image obtaining apparatus and a flying object including this image obtaining apparatus or a moving vehicle. For example, the present invention is available for the image obtaining apparatus which changes a direction that images are obtained, and the flying object or the moving vehicle including the image obtaining apparatus.

BACKGROUND ART

There is a case to optionally design the shape of a housing for a swing-type optical system. For example, in a case of a flying object, the swing-type optical system to optically obtain target images is provided on the tip part of the flying object. In this case, an optical dome is provided on the tip part of the flying object, is formed by material which transmits through light beams having bandwidth to be received with the swing-type optical system, and protects the swing-type optical system. It is desirable that the shape of such an optical dome is designed in the view of the optics and the aerodynamics.

From the view of the optics, while incident light beams from the outside of the optical dome transmit through the optical dome, there is a desire for characteristic not to have an influence on this light as much as possible. In the view of this, when the swing-type optical system performs a swinging operation to obtain outside images from the inside of the optical dome and to change the direction of the eyesight for obtaining images, the following technique is known. In this technique, the shape of the optical dome is formed by the curved surface consisting of a part of the spherical surface in order to minimize a difference in refraction angle of the optical dome with dependence on the swing direction. Here, the swing direction means the direction of the light axis of the swing-type optical system and is determined by this swinging operation. That is, the central point of this spherical surface coincides with the central point of the swinging operation of the swing-type optical system, and the swing-type optical system has the same optical characteristic from the optical dome, even if the swing-type optical system obtains images from any direction. As a result, the optical influence that the swing-type optical system undergoes from the optical dome is restrained.

On the other hand, from the view of the aerodynamic, in the tip part of the flying object, the shape of so-called ogive is more favorable to the curved surface shape which consists of a part of above-mentioned spherical surface. FIG. 1A is a diagram showing an example of an ogive shape 10. FIG. 1B is a diagram showing an example of the definition of the ogive shape 10. In the examples shown in FIG. 1A and FIG. 1B, the ogive shape 10 is defined as the rotating body which is obtained by rotating the predetermined turning arc 12 around a rotation axis 11. The rotation axis 11 is a straight line which does not pass the center 13 of a circle belonging to the arc 12.

In a case that the optical dome has the ogive shape, this case differs from a case that the optical dome has a spherical shape or a part of the spherical shape, a refraction angle in the optical dome differs on the basis of position of incident light beams on the optical dome. This will be described by using an exemplary diagram.

FIG. 1C is a diagram showing an example with the optical characteristic of the optical dome of the ogive shape. FIG. 1C shows the optical dome 20 which shows a part of the optical dome, a first incident light beams 30, a first transmitted light beams 40, a second incident light beams 50 and a second transmitted light beams 60. The optical dome 20 has an outside surface 21 and an inner surface 22. The first incident light beams 30 have a first incident light beam 31, a second incident light beam 32 and a third incident light beam 33. The first transmitted light beams 40 contain a first transmitted light beam 41, a second transmitted light beam 42 and a third transmitted light beam 43. The second incident light beams 50 contain a fourth incident light beam 51, a fifth incident light beam 52 and a sixth incident light beam 53. The second transmitted light beams 60 contain a fourth transmitted light beam 61, a fifth transmitted light beam 62 and a sixth transmitted light beam 63.

The optical dome 20 has a so-called ogive shape. The direction of the rotation axis 11 of this ogive shape is hereinafter used as the reference direction. In the incident light beams 30 which are parallel light, the first incident light beam 31 to the third incident light beam 33 are parallel each other, and have angle θ2 to the reference direction. When the first incident light beams 30 are irradiated on the optical dome 20 from the outside of the optical dome 20, the first incident light beams 30 are refracted on the outside surface 21, moreover are refracted on the inner surface 22, then reach inside of the optical dome 20 as the first transmitted light beams 40. At this time, in the first transmitted light beams 40, the first transmitted light beam 41 to the third transmitted light beam 43 are not parallel each other anymore, that is, the first transmitted light beam 41 to the third transmitted light beam 43 lose parallelism. In the example shown in FIG. 1C, the first transmitted light beam 41 has angle θ2+f to the reference direction, the second transmitted light beam 42 has angle θ2+e to the reference direction and the third transmitted light beam 43 has angle θ2+d to the reference direction. Here, in general, the angles d, e, f are different respectively.

In the same way, in the incident light beams 50 which are parallel light each other, the fourth incident light beam 51 to the sixth incident light beam 53 have angle θ1 to the reference direction. When the second incident light beams 50 are irradiated on the optical dome 20 from the outside of the optical dome 20, the second incident light beams 50 are refracted on the outside surface 21, moreover are refracted on the inner surface 22, then reach inside of the optical dome 20 as the second transmitted light beams 60. At this time, in the second transmitted light beams 60, the fourth transmitted light beam 61 to the sixth transmitted light beam 63 are not parallel each other anymore, in the same way, the fourth transmitted light beam 61 to the sixth transmitted light beam 63 lose parallelism. In the example shown in FIG. 1C, the fourth transmitted light beam 61 has angle θ1+c to the reference direction, the fifth transmitted light beam 62 has angle θ1+b to the reference direction and the sixth transmitted light beam 63 has angle θ1+d to the reference direction. Here, in general, the angles a, b, c are different respectively.

This way, the ogive-shaped surface differs from the spherical surface or the curved surface which consists of the part of the spherical surface. When light beams transmits through the optical dome 20 having an optically symmetrically insufficient shape, by the various refracting phenomenon, even if incident light beams are parallel, there is a case that warp which the transmitted light beams are not parallel occurs, or there is a case that the warp differs in response to position which transmits through the optical dome 20. Furthermore, when the direction and the range of images which have been actually obtained as a result of a swinging operation by the swing-type optical system is called "direction of image obtainment", the direction of the image obtainment differs from the swing direction which has been adjusted in response to the desired direction of image obtainment by the influence of the optical dome 20. Note that the term "direction of image obtainment" is also called "photographing direction".

FIG. 1D is a diagram showing the configuration example of an image obtaining apparatus 110 which is used the optical dome of the ogive shape. The image obtaining apparatus 110 shown in FIG. 1D has a swing-type optical system 120 and an optical dome 140. A swing direction 130 of the swing-type optical system 120 is on the light axis of the swing-type optical system 120 when the swing-type optical system 120 is in a central position.

The swing-type optical system 120 performs a swinging operation mainly in fixed starting point. For example, the swing-type optical system 120 moves to position 121 or position 122 shown in FIG. 1D. The swing direction 131 of the swing-type optical system 120 is on the light axis of the swing-type optical system 120 when the swing-type optical system 120 is in the position 121. The swing direction 132 of the swing-type optical system 120 is on the light axis of the swing-type optical system 120 when the swing-type optical system 120 is in the position 122.

However, when light beams transmit through the ogive-shaped optical dome 140, parallelism is lost from incident light beams from the swing direction by the refracting phenomenon described in the FIG. 1C. The warp has occurred in obtained images by the swing-type optical system 120. Moreover, as referred to FIG. 1C, degrees of the refracting phenomenon differs in response to the swing direction and the characteristic of the warp also differs. In other words, one of the reasons that characteristic of the warp differs is that when the incident light beams transmit through the optical dome having curved surface shapes such as the ogive shape, angle (e.g., α shown in FIG. 1C) differs in response to the swing direction of the swing-type optical system. Here, the angle (α) indicates angle between the swing direction (e.g., D shown in FIG. 1C) of the swing-type optical system and the direction of the perpendicular line (e.g., L shown in FIG. 1C) in an intersection (e.g., I shown in FIG. 1C) on the outer surface 21.

In this way, when the shape of the housing for the swing-type optical system does not have enough optical symmetry, the correction optical system which corrects the image warp which occurs in response to a swing angle (e.g., θ1 shown in FIG. 1C) of the swing-type optical system is required. Here, it is possible to define the swing angle as angle between a light axis (namely, an optical axis of the swing-type optical system, e.g., D shown in FIG. 1C) and the predetermined reference direction (e.g., the rotation axis 11).

In relation to the above, Patent literature 1 discloses an optical apparatus. This optical apparatus has a photography optical system, image blur correction means, vibration detection means, signal generation means and control means. Here, the angular field of view of photography optical system is variable. The image blur correction means corrects the image blur which accompanies vibration. The vibration detection means detects vibration. The signal generation means generates a movement signal based on the output from the vibration detection means. The control means controls the image blur correction means based on the movement signal. The control means changes the characteristic of the signal generation means on the basis of the angular field of view of the photography optical system and the value of the image blur signal.

However the image blur correction means described in the patent literature 1 corrects the image blur which accompanies small vibration with photography optical system, and is not the one which corrects an image warp according to the axial change of the light of the photography optical system.

CITATION LIST

[Patent literature 1] JP 2005-173161A

SUMMARY OF THE INVENTION

When parallel light beams which are parallel transmit through a curved surface-shaped optical dome, refraction angles corresponding to the light beams respectively are different minutely. The light beams are not parallel light beams. Even if variation of the refraction angles differs in response to the swing direction of the swing-type optical system, image obtaining apparatuses having a correction optical system which corrects the influence optically are provided.

According to one embodiment, an image obtaining apparatus has a swing-type optical system, an optical dome and a correction optical system. Here, the swing-type optical system can carry out a swinging operation in fixed range in the swing direction. The optical dome covers the swing-type optical system and transmits through the light beams within this range. When the parallel light beams which was irradiated from the outside transmits through the optical dome, the correction optical system corrects a state that the parallel light beams is not parallel because of the shape of the optical dome before the transmitted light beams is irradiated to the swing-type optical system. The correction optical system carries out correction according to the swing direction of the swing-type optical system.

According to one embodiment, even if refraction angles of the optical dome are different in response to light axial direction of incident light beams, it is possible to correct the difference of the light axis in the suitability, before the transmitted light beams which have been transmitted through the optical dome is irradiated on the swing-type optical system.

BRIEF DESCRIPTION OF THE DRAWINGS

FIG. 1C is a diagram showing an example with the optical characteristic of an optical dome of the ogive shape.

DESCRIPTION OF EMBODIMENTS

First Embodiment

Figure 2A:
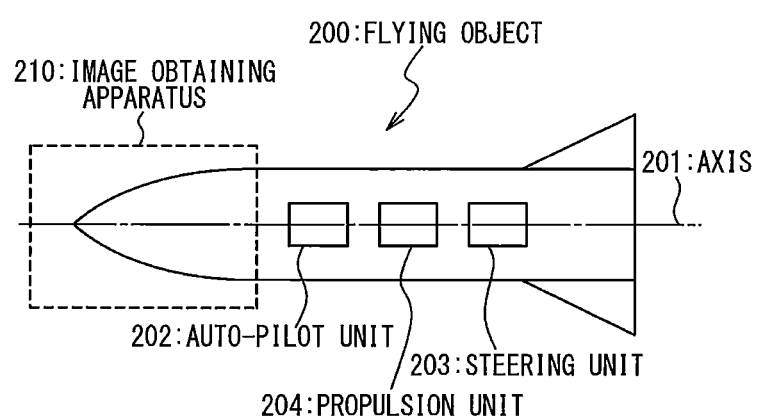
FIG. 2A is a diagram showing a configuration example of a flying object according to a first embodiment of the present invention.

FIG. 2A is a diagram showing a configuration example of a flying object 200 according to a first embodiment of the present invention. The flying object 200 shown in FIG. 2A has an image obtaining apparatus 210 in its tip portion and moreover has an auto-pilot unit 202, a steering unit 203 and a propulsion unit 204. For example, the image obtaining apparatus 210 plays a role on an infrared seeker. Also, an axis 201 is set in the center of the flying object 200 shown in FIG. 2A. In the example of FIG. 2A, flying object 200 is a missile.

The basic operation of each of the units shown in FIG. 2A will be described. The image obtaining apparatus 210 takes an image in front of the flying object 200, optically detect s a direction of a target, and outputs a signal showing the result of the image obtainment. The auto-pilot unit 202 determines a flight direction of the flying object 200 in response to the signal outputted from the image obtaining apparatus 210 and outputs the signal showing the determination. The steering unit 203 controls control vanes of the flying object 200 in response to the signal outputted from the auto-pilot unit 202, and controls the flight direction of the flying object 200. The propulsion unit 204 invents a driving force of the flying object 200.

Figure 2B:
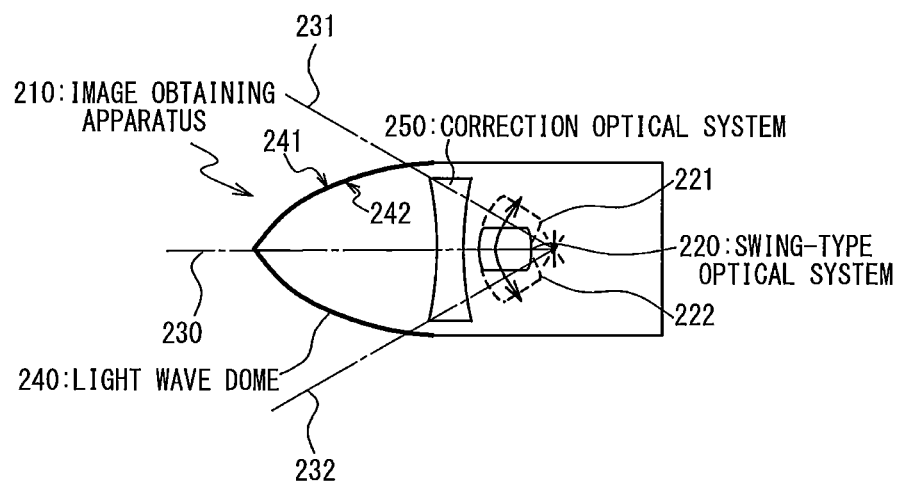
FIG. 2B is a partially exposed view showing a configuration example of the image obtaining apparatus in the first embodiment of the present invention.

FIG. 2B is a partially exposed view showing a configuration example of the image obtaining apparatus 210 in the first embodiment of the present invention. The image obtaining apparatus 210 shown in FIG. 2B has a swing-type optical system 220, an optical dome 240 and a correction optical system 250. The optical dome 240 has an outer surface 241 and an inner surface 242.

The swing-type optical system 220 has an optical system which leads an incident light from outside to a photo detector and a swing mechanism which appropriately adjusts a light axial direction of the optical system, as an example. In other words, in one embodiment, the swing-type optical system 220 has a function as an infrared seeker. The swing-type optical system 220 includes an imager which receives infrared light. The swing-type optical system 220 is adapted to adjust a photographing direction based on a swinging operation. The swing-type optical system 220 takes images of a photographic object.

For example, the optical system may be configured from a combination of optical devices such as convex lenses, concave lenses, reflectors, a prism, and filters.

In an example shown in FIG. 2B, the swing mechanism of the swing-type optical system 220 moves the optical system 220 by an electrically controlled motor and so on to adjust the position and direction of the optical axis. An operation which tilts the whole of optical system by taking a predetermined fulcrum as a center may be contained in this adjustment. The fulcrum may be defined virtually as an intersection point of the plurality of rotation axes and the virtual fulcrum may be arranged inside the swing-type optical system 220.

Positions 221 and 222 of the swing-type optical system 220 shown in FIG. 2B show a first position and a second position when the swing-type optical system 220 carries out a swinging operation. A swing direction 230 is on the central light axis of the swing-type optical system 220 when the swing-type optical system 220 is in a central position. The swing direction 231 is on the light axis of the swing-type optical system 220 when the swing-type optical system 220 is in the position 221. The swing direction 232 is on the light axis of the swing-type optical system 220 when the swing-type optical system 220 is on the position 222. Namely, the swinging operation is indicated as follows. The swing-type optical system 220 rotates from a position (e.g. the central position) to a desired position (e.g., the position 221 or the position 222) around the fulcrum so as to swing. Thus, the light axis of the swing-type optical system 220 also rotates around the fulcrum. That is, each of the swing direction 231 and 232 indicates the light axis of the swing-type optical system 220. When the swing-type optical system 220 is in the central position, the light axis of the swing-type optical system 220 is along the axis 201 of the flying object 200.

Note that the swing direction of the swing-type optical system 220 can take a direction orthogonal to the drawing in addition to the directions of the arrows shown in FIG. 2B, and the swinging operation is possible within a predetermined range of a solid angle.

Figure 1A:
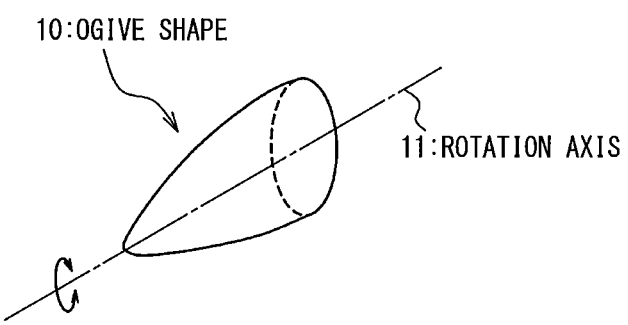
FIG. 1A is a diagram showing an example of an ogive shape.
Figure 1B:
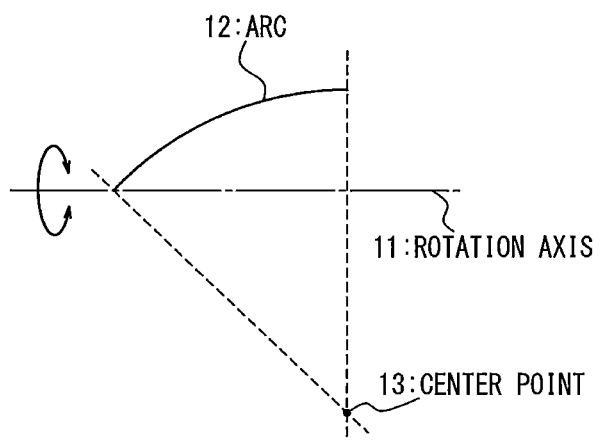
FIG. 1B is a diagram showing an example of a definition of the ogive shape.
Figure 1D:
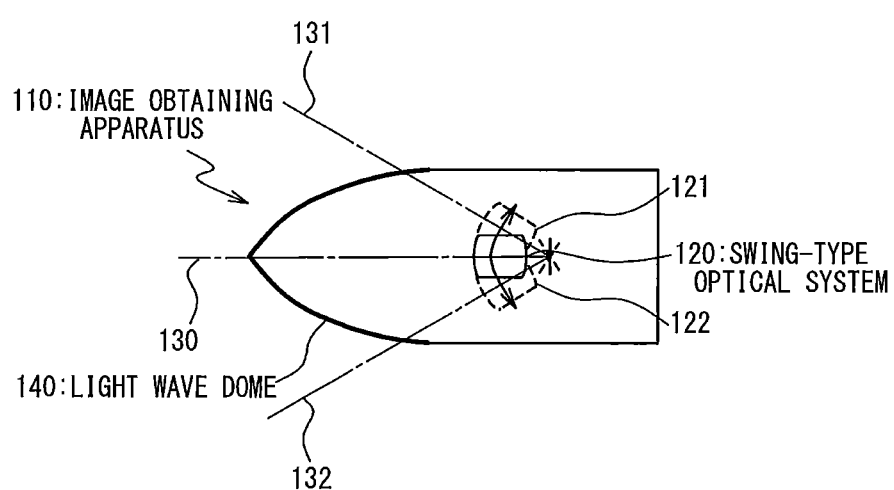
FIG. 1D is a diagram showing the configuration example of an image obtaining apparatus which is used the optical dome of the ogive shape.

The optical dome 240 has a so-called ogive shape as shown in FIG. 1A to FIG. 1C, and the optical characteristics are not uniform, depending on an incident position and direction of a transmissive beam. A rotation axis of a rotating body can be defined with respect to the ogive shape of the optical dome 240. However, in examples shown in FIG. 2A and FIG. 2B, the rotation axis of the optical dome 240 coincides with the axis 201 of the flying object 200, as shown in FIG. 2A, and moreover coincides with the swing direction 230 shown in FIG. 2B. Hereinafter, the direction or axis is called a reference direction or reference axis. The above coincidence does not limit the present invention to the examples. In this example, an angle between the swing direction of the swing-type optical system and the reference direction is called a swing angle of the swing-type optical system. In fact, the swing angle is expressed by two kinds of angles (e.g., $\theta$ and $\phi$). However, the optical dome 240 has a rotational symmetry with respect to the axis 201 of the flying object shown in FIG. 2A. Therefore, in the following explanation, the above-mentioned $\theta$ is used as the swing angle.

In other words, the optical dome 240 may have the following curved surface shape. In this curved surface shape, an angle $\alpha$ shown in FIG. 1C differs in response to the swing direction. That is, the angle $\alpha$ changes in response to rotation of the light axis of the swing-type optical system 220. Here, let us consider a case that the swing-type optical system 240 rotates from the central position to the position 221 around the fulcrum. In this case, for example, the rotational axis 11 shown in FIG. 1C is equated with the swing direction 230 shown in FIG. 2B when the swing-type optical system 240 is in the central position. The swing direction D shown in FIG. 1C is equated with the swing direction 231 when the swing-type optical system 240 is in the position 221. The angle $\alpha$ indicates an angle between the swing direction (e.g., 231) and a perpendicular direction (e.g., L). This also means that the angle $\alpha$ is an angle between the light axis of the swing-type optical system 220 and the imaginary perpendicular line L to the outer surface 241 (which corresponds to 21 shown in FIG. 1C). This perpendicular line L passes the intersection I of the light axis of the swing-type optical system 240 (namely, photographing direction, or the swing direction 231 shown in FIG. 2B) and the outer surface 241.

It is desirable that the material of the optical dome 240 has optical characteristics, by which the light of the wavelength range received by the swing-type optical system 220 transmits through the optical dome 240. As an example, when the swing-type optical system receives an infrared light beam, sapphire ($Al_2O_3$), magnesium fluoride (MgF2), blende (ZnS) and so on are usable as the material of the optical dome 240.

A correction optical system 250 is arranged between the optical dome 240 and the swing-type optical system 220 and is fixed to the optical dome 240. Namely, relative location between the correction optical system 250 and the optical dome 240 is uniform. As shown in FIG. 1C, because incident parallel light beams into the optical dome 240 having the ogive shape are converged, the correction optical system 250 such as a concave lens is disposed between the optical dome 240 and the optical system 220, as shown in FIG. 2B. However, this is only an example. The correction optical system 250 may be configured by using optical devices except the concave lens, and by use of a combination of a plurality of optical devices. In other words, the correction optical system 250 is designed on the basis of the shape of the optical dome 240. Specifically, the optical correction system 250 is designed so as to cancel the angle α. In general, the angle α is known in advance at design stage of the optical dome 240.

The transmitted light beams 40, 60 after parallel light beams 30, 50 incident from outside transmit through the optical dome 240 lose the parallelism due to the shape of the optical dome 240. The correction optical system 250 corrects the transmitted light beams 40, 60 correct into parallel light beams parallel to the swing direction before the transmitted light beams 40, 60 are incident on the swing-type optical system 220. The correction by the correction optical system 250 may be carried out appropriately in relation to the swing direction, because a direction and quantity of the correction are different depending on the swing direction of the swing-type optical system 220.

At this time, as shown in FIG. 2B, light paths of the incident light beams on the swing-type optical system 220 penetrates are different in the correction optical system 250, according to the swing angle of the swing-type optical system 220, that is, the swing directions 230 to 232 of the swing-type optical system 220. More specifically, a central region of the correction optical system 250 is used when the swing-type optical system 220 in the center position acquires an image in the swing direction 230. On the other hand, an end region of the correction optical system 250 is used, when the swing-type optical system 220 in the position 221 or 222 acquires an image in the swing direction 231 or 232. Namely, the correction optical system 250 corrects the transmitted light beams through the optical dome 240 to parallel light beams parallel to the photographing direction.

This shows that a different region of the correction optical system 250 is usable as light paths according to the different swing angle. Therefore, by designing the shape and fixed position of the correction optical system 250 according to the shape of the optical dome 240, the appropriate correction by the correction optical system 250 can be carried out according to the swing angle of the swing-type optical system 220. As a result, it is possible to restrain that a warp is induced in the image acquired by the swing-type optical system 220 due to the shape of the optical dome 240 whose refraction angle is different depending on the swing angle.

Second Embodiment

Figure 3:
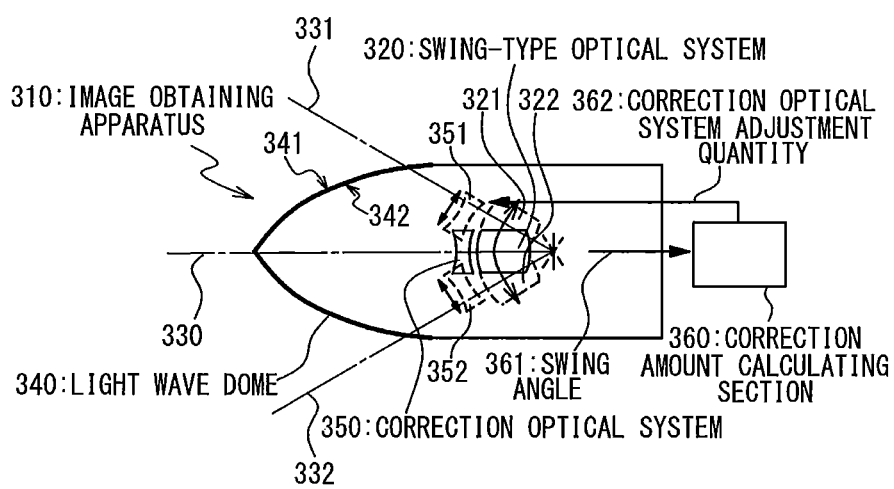
FIG. 3 is a partially exposed view showing a configuration example of an image obtaining apparatus according to a second embodiment of the present invention.

FIG. 3 is a partially exposed view showing a configuration example of an image obtaining apparatus 310 according to a second embodiment of the present invention. The image obtaining apparatus 310 shown in FIG. 3 is the same as the image obtaining apparatus 210 shown in FIG. 2B except for the following changes, that is, except that the correction optical system 250 shown in FIG. 2B is changed to a correction optical system 350 and that a correction amount calculating section 360 is added. Similarly to the first embodiment, the optical dome 340 has an outer surface 341 and an inner surface 342.

The other components meet the following correspondence relation. That is, a swing-type optical system 320 shown in FIG. 3 corresponds to the swing-type optical system 220 shown in FIG. 2B. Swing directions 331, 332 shown in FIG. 3 correspond respectively to the swing directions 231, 232 shown in FIG. 2B. An optical dome 340 shown in FIG. 3 corresponds to the optical dome 240 shown in FIG. 2B. Because the components contained in these correspondence relations are the same as those of the first embodiment shown in FIG. 2B, further detailed description is omitted.

In the image obtaining apparatus 310 shown in FIG. 3, the position and light axial direction of the correction optical system 350 are automatically adjusted in connection with the swinging operation of the swing-type optical system 320. In other words, the position and light axial direction of the correction optical system 350 are automatically adjusted according to the swing angle of the swing-type optical system 320.

This adjustment is controlled by the correction amount calculating section 360. That is, the correction amount calculating section 360 controls the correction optical system 350 in response to the photographing direction (the swing direction). The correction amount calculating section 360 is also called "controller" and has a hardware processor, a memory and hardware circuits or the like so as to carry out the following operations. First, an angle sensor (not shown) disposed in the swinging mechanism detects the swing angle of the swing-type optical system 320, and generates and outputs a signal showing the swing angle to the correction amount calculating section 360. With respect to the above-mentioned angle sensor, the swing-type optical system 320 itself may have this angle sensor instead of the swinging mechanism. Next, the correction amount calculating section 360 inputs the swing angle 361 by an output signal from the angle sensor, calculates a correction optical system adjustment quantity 362 based on the detected swing angle, and generates and outputs a signal showing this calculation result to the correction optical system 350. Next, the correction optical system 350 inputs the correction optical system adjustment quantity 362 by a signal outputted from the correction amount calculating section 360, and adjusts the position and light axial direction of the correction optical system based on the correction optical system adjustment quantity 362. Therefore, in one embodiment, the position of the correction optical system 350 changes so as to follow the the position of the the swing-type optical system 320. Namely, the correction optical system 350 indicates a lens-shift-type optical system which adjusts the position and the light axial direction.

Note that the calculation of the correction optical system adjustment quantity 362 based on swing angle 361 may be carried out by a control unit executing a program stored in a memory and may carry out by reading a numerical value matching a condition from a table stored in the database.

The correction optical system 350 shown in FIG. 3 is drawn as a concave lens from the same reason as in case of the correction optical system 250 shown in FIG. 2B. However, this is only an example. The correction optical system 350 may be configured by using an optical device except for the concave lens, and may be configured from a combination of a plurality of optical devices.

When the correction optical system 350 is configured from the combination of the plurality of optical devices, the position relation of these optical devices can be dealt with under the control by the correction amount calculating section 360. In other words, a control quantity for the position relation of the plurality of optics devices configuring the correction optical system 350 may be contained in the correction optical system adjustment quantity 362.

By configuring in this way, the same correction effect shown in the first embodiment of the present invention shown in FIG. 2B can be attained even in the image obtaining apparatus according to the second embodiment of the present invention shown in FIG. 3. The range of the swinging operation of the swing-type optical system 220 at the first embodiment of the present invention is limited by the correction optical system 250. However, there is no limitation in the second embodiment of the present invention, and the degrees of freedom the swinging operation of the swing-type optical system increase and also the miniaturization of the image obtaining apparatus 310 becomes possible.

Because the operation of the other components of the image obtaining apparatus according to the second embodiment of the present invention shown in FIG. 3 is the same as in the first embodiment shown in FIG. 2B, further detailed description is omitted.

Third Embodiment

Figure 4:
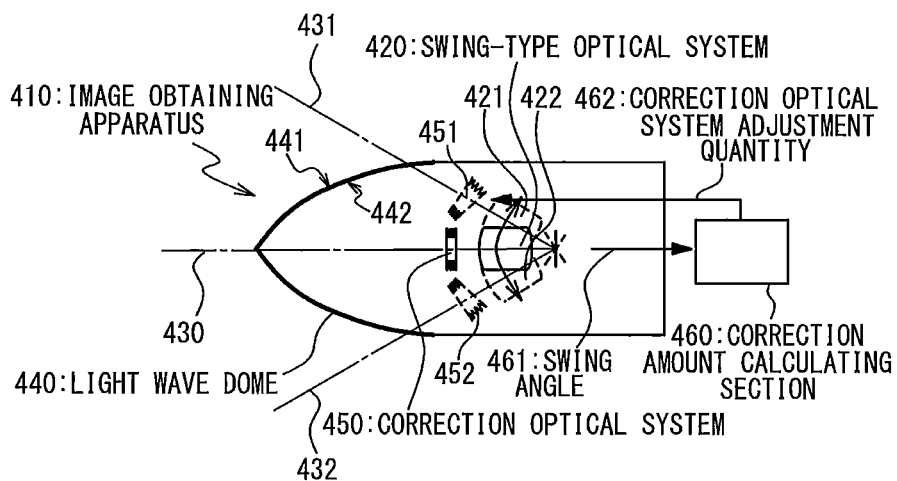
FIG. 4 is a partially exposed view showing a configuration example of an image obtaining apparatus according to a third embodiment of the present invention.

FIG. 4 is a partially exposed view showing a configuration example of an image obtaining apparatus 410 according to a third embodiment of the present invention. The image obtaining apparatus 410 shown in FIG. 4 is the same as the image obtaining apparatus 310 according to the second embodiment of the present invention shown in FIG. 3 except for the following changes, that is, except that the correction optical system 350 and the correction amount calculating section 360 shown in FIG. 3 are changed to a correction optical system 450 and a correction amount calculating section 460, respectively. Similarly to the first embodiment, the optical dome 440 has an outer surface 441 and an inner surface 442.

The other components meet the following correspondence relation. That is, a swing-type optical system 420 shown in FIG. 4 corresponds to the swing-type optical system 320 shown in FIG. 3. Swing directions 431, 432 shown in FIG. 4 correspond respectively to the swing directions 331, 332 shown in FIG. 3. An optical dome 440 shown in FIG. 4 corresponds to the optical dome 340 shown in FIG. 340. Because the components contained in these correspondence relations are the same as those of the second embodiment shown in FIG. 3, further detailed description is omitted.

At the image obtaining apparatus 410 according to the third embodiment of the present invention shown in FIG. 4, an optical system including so-called variable angle prism is used as a correction optical system 450. The variable angle prism is a prism, of which the apex angle is adjustable, provided with two lenses, connected to each other via bellows for example, and a liquid, with a refractive index same as the lenses and arranged between the lenses, and configured in such a way the angle between the lenses is adjustable. That is, the apex angle of the variable angle prism is adjusted by the correction amount calculating section 460. By using such a variable angle prism, at the image obtaining apparatus 410 in this embodiment, further number of degrees of freedom is being added to the correcting operation of the correction optical system 450.

In other words, the correction amount calculating section 460 as a controller controls three parameters. The first one is the position of the correction optical system 450. The second one is the direction of the light axis of the correction optical system 450. The third one is the apex angle of the correction optical system 450. The correction amount calculating section 460 adjusts the three parameters based on the swing angle of the swing-type optical system 420 such that the transmitted light beams are the parallel light beams.

Therefore, in the image obtaining apparatus 410 shown in FIG. 4, the object of the control by the correction amount calculating section 460 includes the apex angle of the variable angle prism in addition to the position and the light axial direction of the correction optical system 450. Because the other components and the operation of the correction amount calculating section 460 are the same as those of the second embodiment, further detailed description is omitted.

By configuring in this way, the same correction effect shown in the first embodiment of the present invention shown in FIG. 2B can be attained even in the image obtaining apparatus according to the third embodiment of the present invention shown in FIG. 4.

Because the operation of the other components of the image obtaining apparatus according to the third embodiment of the present invention shown in FIG. 4 is the same as in the second embodiment shown in FIG. 3, further detailed description is omitted.

Fourth Embodiment

Figure 5:
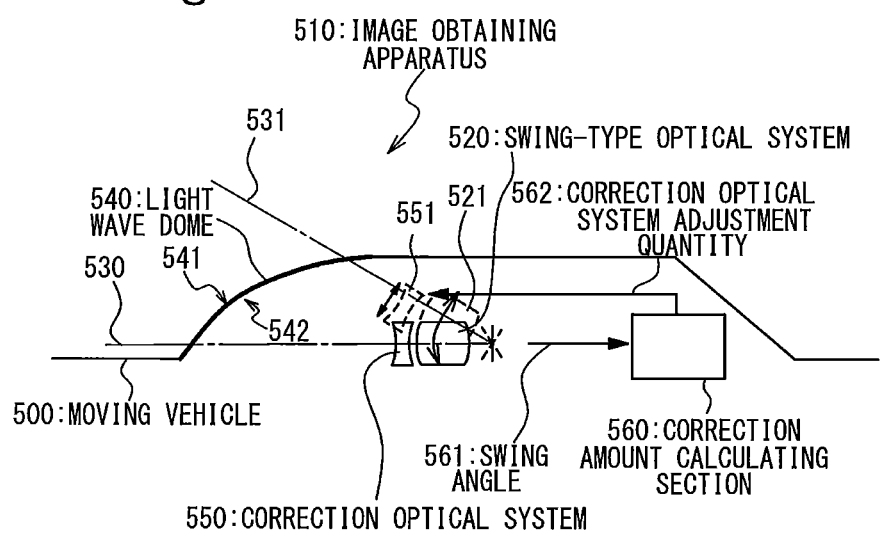
FIG. 5 is a partially exposed view showing a configuration example of an image obtaining apparatus according to a fourth embodiment of the present invention.

FIG. 5 is a partially exposed view showing a configuration example of an image obtaining apparatus 510 according to a fourth embodiment of the present invention. In this embodiment, an image obtaining apparatus 510 provided on the surface of a moving vehicle 500 such as an aircraft will be described instead of the flying object 200 which is presupposed with the first to the third embodiments of the present invention. Similarly to the first embodiment, the optical dome 540 has an outer surface 541 and an inner surface 542.

The image obtaining apparatus 510 shown in FIG. 5 has a swing-type optical system 520, an optical dome 540, a correction optical system 550 and a correction amount calculating section 560.

The optical dome 540 according to this embodiment has a shape, which seems as if a part of the curved surface would be cut from the optical dome 240, 340 or 440 according to the first to the third embodiments to be provided for the surface of moving vehicle 500. That is, the optical dome 540 has a shape including a part of the ogive shape shown in the optical dome 240, 340 or 440. Therefore, there is a case that the shape of the optical dome 540 differs from so-called ogive shape in the strict meaning, and the rotation axis as the rotating body cannot be defined. In this case, the axis of moving vehicle 500 may be substituted for the reference direction which defines the swing angle of the swing-type optical system.

In this embodiment, the range where the swing directions 530 and 531 of the swing-type optical system 520 can be taken is narrower than the case of the first to the third embodiments because the shape of the optical dome 540 differs from the case of the first to the third embodiment. However, the other configuration and the operation of the image obtaining apparatus 510 according to this embodiment are the same as the case of the first to the third embodiments, and are related to each of components as follows.

The swing-type optical system 520 shown in FIG. 5 corresponds to the swing-type optical system 320 shown in FIG. 3. The swing direction 531 shown in FIG. 5 corresponds to the swing direction 331 shown in FIG. 3. The correction amount calculating section 560 shown in FIG. 5 corresponds to the correction amount calculating section 360 shown in FIG. 3. Because the components contained in these correspondence relations are the same as those of the second embodiment shown in FIG. 3, further detailed description is omitted.

According to this embodiment, the image obtaining apparatus 510 according to the present invention becomes able to be provided for any kinds of the moving vehicle 500, especially the trunk of a high speed moving aircraft in addition to the flying object 200 and so on.

The invention accomplished by inventors was specifically described based on the embodiments on the above. However, the present invention is not limited to the embodiments. Needless to say, various changes are possible in the range which the present invention does not deviate from the point. Furthermore, each of characteristics described on the embodiments is able to be freely combined with the embodiments in the range which does not contradict technically. For example, the correction optical system 250 according to the first embodiment or the correction optical system 450 according to the third embodiment may be embodiment with the image obtaining apparatus 510 according to the fourth embodiment.

What is claimed is:

1. An image obtaining apparatus comprising:
a swing-type optical system configured to adjust a photographing direction based on a swinging operation;
an optical dome which covers the swing-type optical system and transmits through incident light beams; and
a correction optical system,
wherein the optical dome has a curved surface shape,
wherein the curved surface shape is a curved surface shape that an angle between a light axis of the swing-type optical system and an imaginary perpendicular line to a surface of the optical dome differs in response to the photographing direction, the imaginary perpendicular line passes an intersection of the surface of the optical dome and the light axis of the swing-type optical system,
wherein the incident light beams are parallel light beams parallel to the photographing direction,
wherein the correction optical system corrects transmitted light beams through the optical dome to parallel light beams parallel to the photographing direction,
and wherein the correction optical system is arranged between the optical dome and the swing-type optical system and is fixed to the optical dome.

2. The image obtaining apparatus according to claim 1, wherein the transmitted light beams pass in different positions in response to the photographing direction.

3. The image obtaining apparatus according to claim 1, wherein a shape of the optical dome includes an ogive shape.

4. The image obtaining apparatus according to claim 1, wherein a shape of the optical dome includes a part of an ogive shape.

5. A flying object comprising:
an image obtaining apparatus;
an auto-pilot unit configured to determine a direction of a progress based on an image obtained by the image obtaining apparatus; and
a steering unit configured to control the direction of the progress based on a determination by the auto-pilot unit,
wherein the image obtaining apparatus comprises:
a swing-type optical system configured to adjust a photographing direction based on a swinging operation;
an optical dome which covers the swing-type optical system and transmits through incident light beams; and
a correction optical system,
wherein the optical dome has a curved surface shape,
wherein the curved surface shape is a curved surface shape that an angle between a light axis of the swing-type optical system and an imaginary perpendicular line to a surface of the optical dome differs in response to the photographing direction, the imaginary perpendicular line passes an intersection of the surface of the optical dome and the light axis of the swing-type optical system,
wherein the incident light beams are parallel light beams parallel to the photographing direction,
wherein the correction optical system corrects transmitted light beams through the optical dome to parallel light beams parallel to the photographing direction,
and wherein the correction optical system is arranged between the optical dome and the swing-type optical system and is fixed to the optical dome.

6. The flying object according to claim 5, wherein the transmitted light beams pass in different positions in response to the photographing direction.

7. The flying object according to claim 5, wherein a shape of the optical dome includes an ogive shape.

8. The flying object according to claim 5, wherein a shape of the optical dome includes a part of an ogive shape.

* * * * *